May 7, 1963
J. M. CORDREY ET AL
3,088,943
PROCESS FOR MAKING ALKALI METAL SALT
OF CARBOXYMETHYLCELLULOSE
Filed Oct. 21, 1960
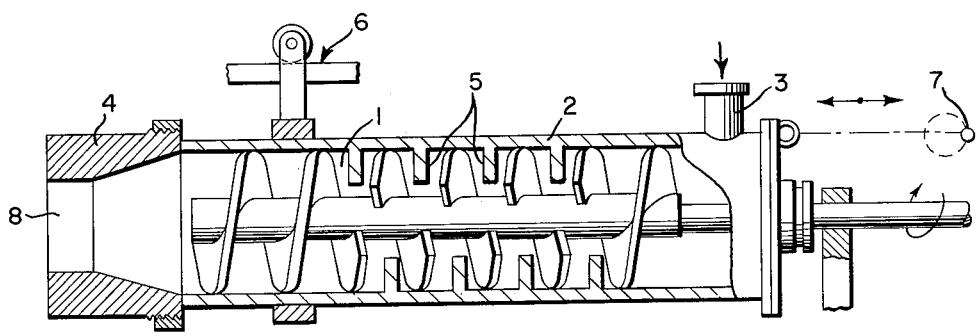
INVENTORS
JAMES M. CORDREY
STANLEY T. DRUCKENMILLER
JAMES E. LUFKIN
BY
Jules H. Steinberg ATTORNEY – 3,088,943
PROCESS FOR MAKING ALKALI METAL SALT OF CARBOXYMETHYLCELLULOSE
James M. Cordrey, Wilmington, Del., and Stanley T. Druckenmiller, Wenonah, and James E. Lufkin, Woodbury, N.J., assignors to E. I. du Pont de Nemours and Company, Wilmington, Del., a corporation of Delaware
Filed Oct. 21, 1960, Ser. No. 64,979
3 Claims. (Cl. 260—231)

The present invention relates to a process for the preparation of alkali metal salts of carboxymethylcellulose (CMC). More particularly, the present invention relates to a novel process for the preparation of sodium CMC involving the direct etherification of soda cellulose with monochloroacetic acid.

This application is a continuation-in-part of our prior copending application Serial No. 725,900 filed April 2, 1958.

Prior art processes for the preparation of sodium CMC on a commercial scale almost all involve the reaction of soda cellulose with monochloroacetic acid. The earlier processes were "dough" processes in which relatively little liquid was present in the reaction mass. The reaction mass was thus dough-like in consistency, and required extensive mixing and agitation in order to accomplish a relatively thorough dispersion of the reactants. It was also very difficult to remove the occluded salt and other impurities from the doughy reaction mass. In more recent years, slurry etherification techniques have come into use, as typified for example, by U.S. Patent 2,517,577 to Klug et al. In the slurry techniques, large amounts of alcohol or other diluents are present to maintain the reaction mass in a slurry state whereby thorough and uniform contact of the reactants can occur.

The object of these and other etherifications is first to open the cellulose fibers by mercerizing the cellulose with aqueous alkali, and thereafter to bring the etherifying agent into intimate and uniform contact with the cellulose particles. These prior art techniques, however, have significant economic disadvantages from a manufacturing standpoint. The success of the "dough" processes depends upon prolonged mixing of the dough-like reaction mass. Incomplete or insufficient mixing results in low reaction efficiencies and non-uniform etherification of the cellulose which result in a CMC product having poor solution properties. Even at its best, the quality of the CMC product obtainable with a "dough" process is inferior and, in addition, it is difficult to separate impurities from the final product.

Slurry etherification techniques eliminate may of the disadvantages inherent in dough processes, i.e., heavy mixing equipment is not required, reaction periods are much shorter, and the quality of the product obtainable is good to excellent. However, the large amounts of alcohol or other diluents required, along with the large-volume equipment needed to handle all this material plus the other reactants, have an adverse effect on the cost of the final product.

We have found a novel process for the preparation of alkali metal CMC which overcomes the difficulties and disadvantages of the principal prior art processes and results in a uniformly etherified, high-quality product having excellent dissolution properties, and which process is economical and results in a superior product at a relatively low cost.

In accordance with the present invention, we provide an etherification process which is conducted in two separate and distinct stages. In the first stage, cellulose starting material is treated with aqueous alkali to form alkali cellulose. In the second stage, the alkali cellulose from the first stage is treated with monochloroacetic acid to form the alkali metal CMC ether. A critical feature of the present process is the use in both stages of the process of an intense mixing and pressure extrusion apparatus which provides intimate dispersion of the reactants in very short time.

In order to further overcome the difficulties and disadvantages of the "dough" process, a reaction mass is employed in the present process which contains considerably more liquid than is customarily present in "dough" etherification, but considerably less liquid than is customarily present in slurry etherification techniques. However, the reaction mass in both stages of the present process does contain substantial amounts of liquids which must be uniformly and completely dispersed throughout the mass if the process is to be carried out efficiently and effectively.

We have found that the necessary uniform dispersion of the reactants is accomplished most efficiently and economically in the present process by the use of a combination mixing and extrusion apparatus. The mixing portion of the apparatus which may be used consists of a suitably housed rotary screw, such as is frequently encountered in pressure extrusion equipment. In order to enhance the mixing action, a series of projecting teeth may be provided on the inner face of the screw casement. The casement itself may be oscillated in a lateral direction with the teeth passing through suitable indentations in the flights of the screw to permit the oscillation while the screw is rotating. The combined action of the rotating screw and the oscillating teeth moving laterally of the screw accomplishes to a substantial extent a dispersion of the liquid and solid components of the reaction mass. Alternatively, the screw itself may be oscillated in an axial direction while it rotates, the casement being maintained in a fixed position.

The reaction mass in the present process may be likened to a partially wetted sponge having some areas which are very wet, some areas which are damp, and some areas which are relatively dry. In order to distribute the liquids completely and uniformly throughout this spongy material, the entire mass is compressed to redistribute the liquid into thorough and uniform contact with all portions of the sponge. In the present process, this pressure is applied by means of a simple die mechanism, preferably having but one single central aperture, on the discharge end of the rotary screw. The rotation of the screw mixes the reaction mass to a substantial extent, as outlined above; moves the mass at a controlled rate to the die; and then forces the mass under pressure through the die opening. The pressure thus exerted on the reaction mass as it is forced through the constricted die opening distributes the liquids thoroughly and evenly throughout the solid components and results in uniform and intimate contact of the reactants.

In order to more fully illustrate one form of mixing and extrusion apparatus which may be used to carry out the process of the present invention, reference is now made to the accompanying drawing which shows a longitudinal section through one form of suitable apparatus.

In the drawing, 1 is a rotary mixing screw housed in casing 2. The reaction mass enters the apparatus at inlet 3 and is discharged through die 4. A plurality of tooth-like projections 5 are mounted integral with the inner wall of casing 2. Casing 2 is mounted, by means of wheel-and-track assembly 6, to permit axial oscillation. The oscillation may be brought about by means of any suitable crank mechanism, indicated schematically at 7. Suitable gaps or indentations in the flights of the screw are provided at proper intervals to accommodate the axial oscillation of teeth 5 as the latter reciprocate in an axial direction.

The screw mixer depicted in the drawing forms no part of the present invention and is disclosed herein for illustration purposes only as one type of apparatus suitable for use in the process of the present invention. Further structural and operational details of this particular apparatus may be found in U.S. Patent 2,505,125, issued April 25, 1950, to H. List.

The discharge end of the screw casement is provided with a die 4, shown in the attached drawing with a single central aperture 8, and this represents a preferred, but not required, form of the invention. If a die having a multiplicity of die openings is used, not all parts of the reaction mass passing through the die are in direct contact with each other; i.e., the reaction mass in compartmentalized as it passes through the die, and uniform distribution of the liquid throughout the solid components by the compressing action described above may not occur to the same extent as in the case where the die has a single opening. Die opening 8 may be provided with a laterally adjustable conical insert (not shown) which may be used to adjust the area of the die opening and thus vary the pressure on the mass being extruded.

According to the present invention, the reaction mass is subjected to the action of the combined mixing and pressure extrusion in both stages of the present process, i.e., the preparation of alkali cellulose from cellulose and aqueous alkali (stage one) followed by the subsequent etherification of the alkali cellulose with monochloroacetic acid (stage two).

The reactant ratios and the amount of liquid present in the reaction mass in both stages of the processes are critical features of the invention which must be carefully observed if the superior products and economic advantages of the invention are to be achieved.

The cellulose starting material may be any suitable cellulose product, such as refined wood pulp or cotton linters. The cellulose starting material is comminuted and the particles are preferably no larger than those which will pass through a screen having openings of 1.5 millimeters. If the particle size of the cellulose starting material is larger, reaction efficiency is lowered and the dissolution properties of the product are adversely affected.

There is present in both stages of the process, in addition to water, a lower alkanol having from 2 to 4 carbon atoms, such as ethanol, isopropanol, tert-butanol, etc. Ethanol is preferred. The ratio of water to cellulose present throughout the process must be within the range of about 0.4 to 1.2 parts by weight of water per part of cellulose, and at least 75% of this water must be present during the first stage. Larger amounts of water will adversely affect reaction efficiencies and the solution properties of CMC product, and smaller amounts of water will result in a non-uniformly etherified product. The amount of alkanol present throughout the process must be in the range of about 1.0 to 2.5 parts by weight per part of cellulose, and at least about 35% of the alkanol must also be present during the first stage. Lower alcohol concentrations will result in non-uniformly etherified products, while higher concentrations will adversely affect both reaction efficiency and product quality. If desired, the entire quantity of alcohol and/or water may be added to the first stage. This corresponds to a maximum total liquid-to-cellulose weight ratio in the first stage of 3.7 to 1. When the entire amount of liquid is added in the first stage, the monochloroacetic acid is added as a solid in the second stage. It is preferably, however, to add a portion of the alcohol in the second stage in the form of a solution of the monochloroacetic acid. Alternatively, the acid may be added as an aqueous solution.

In the preparation of alkali CMC, the ratio of alkali added during the first stage to monochloroacetic acid present during the second stage must be in the range of about 0.86 to 1.25 parts by weight of alkali per part of monochloroacetic acid. Greater amounts of alkali will unduly lower the reaction efficiency, while too low an alkali-to-monochloroacetic acid ratio lower both reaction efficiency and product uniformity. While any alkali may be used to prepare the corresponding alkali metal salt of CMC, caustic soda, i.e., sodium hydroxide, represents the preferred alkali and the product obtained is sodium CMC.

The ratios indicated above represent outside limits, and in most cases it will be preferred to operate well within these ranges. For example, the preferred ratio of water to cellulose in most cases will lie in the range of about 0.60 to 1.0 parts by weight of water per part of cellulose (at least about 75% of the water being present during the first stage). The preferred amount of ethanol or other lower alkanol present per part of cellulose will lie in the range of about 1.6 to 2.0 parts by weight of alkanol per part of cellulose (at least 35% of the alkanol being present during the first stage). The preferred alkali-to-monochloroacetic acid weight ratio will lie in the range of 0.90 to 1.0 parts of alkali per part of monochloroacetic acid.

In practice, the cellulose starting material is first wetted with the specified amount of the alkanol and the aqueous alkali is added to the thus wetted cellulose. The order in which the cellulose is mixed with the alkanol and the alkali is not critical. The alcohol, alkali, and cellulose may be premixed for a short period with any convenient mixing apparatus and the resulting mass then fed into the combination mixing and extruding apparatus, or the reactants may be fed directly into the combination mixing and extrusion apparatus without premixing. In the case of the apparatus illustrated in the attached drawing, the mass enters at inlet 3. The rate of rotation of screw 1 is controlled to retain the reaction mass in the apparatus until the desired extent of mixing is accomplished. The reaction mass is extruded from the apparatus through die opening 4 and then steeped for a period of at least about 10 minutes to allow the alkali to penetrate the cellulose fibers and open the cellulose structure. This is a critical feature of the invention, and in mose cases the steeping will be for a longer period, such as one-half hour. Still longer steeping period can be used when low-viscosity products are desired. The preparation of alkali cellulose in this fashion constitutes the first stage of the two-stage process.

The second stage of the process involves reaction of the product from the first stage with the etherifying agent, monochloroacetic acid.

The alkali cellulose may be premixed on any suitable apparatus for a short period with the necessary amount of an alcoholic solution of the monochloroacetic acid after which the resultant mass is subjected to the mixing and pressure extrusion step, for example, by means of the apparatus illustrated in the drawing. The premixing is optional and is not essential to the process. The rate of rotation of screw 1 is again controlled to give the retention time and extrusion pressure desired, and the reaction mass is discharged from the apparatus via die 4. The extruded mass is aged for a period of at least about one-half hour in order to permit the etherifying agent to react with the alkali cellulose. The preferred aging period is one to two hours. Appreciably shorter reaction periods will result in incompletely etherified products. The reaction mass may be agitated, if desired, by any convenient means during the reaction period, but such agitation is not required in the present process.

The final alkali metal CMC product is crumb-like in nature and dissolves in water to give solutions which are substantially completely free of haze and unreacted cellulosic fibers.

The following examples serve to illustrate the present invention. Parts and percentages, where given in the examples, are by weight.

*Example 1*

Five hundred parts of shredded wood pulp which contained approximately 5% moisture and which passed through a screen having openings of 1.5 millimeters was put into a sigma-blade type mixer. While the pulp was being agitated, it was sprayed with 491 parts of 66.0% sodium hydroxide solution followed by 450 parts of 86.0% ethanol. When all the sodium hydroxide and ethanol had been added, mixing of the mass was continued for 1 minute. The mass was then passed at a rate of 35 parts per minute through a screw-type mixer equipped with an extrusion die having a single central die opening, such as is illustrated in the attached drawing. The minimum inner diameter of the die was 1⅜ inches, and the diameter of the mixing screw was 2 inches. The screw was rotated at a speed of 50 r.p.m., and the teeth oscillated at 50 cycles per minute. The extruded column of the reaction mass was passed through a high-speed comminuter and subsequently steeped with mild agitation for 25 minutes at 30–40° C. The soda cellulose was then sprayed with an alcoholic solution of monochloroacetic acid composed of 545 parts of 86.0% ethanol and 332 part of monochloroacetic acid. When all the ethanol and monochloroacetic acid had been added, mixing of the mass was continued for 1 minute. The reaction mass was then passed at a rate of 50 parts per minute through a screw mixer of the aforementioned type and size, and after passage through a comminuter, it was dynamically aged for 2 hours at 60–65° C. The final product was a mass of yellowish crumbs. The reaction efficiency of the run was 73.3% based upon a theoretical degree of etherification of 1.2 (mole ratio of monochloroacetic acid to anhydroglucose unit of cellulose) and an actual degree of etherification of 0.88. A 2% solution of this material in water was clear and essentially fiber-free.

*Example II*

The procedure described in Example I was repeated except that 500 parts of shredded wood pulp containing approximately 5% moisture was sprayed with 382 parts of 63.6% sodium hydroxide solution followed by 450 parts of 86.0% ethanol. In the second stage, the soda cellulose from the first stage was sprayed with an alcoholic solution of monochloroacetic acid consisting of 545 parts of 86.0% ethanol and 249.5 parts of monochloroacetic acid. The reaction efficiency of the run was 78.9% based on a theoretical degree of etherification of 0.90 and an actual degree of etherification of 0.71. A 2% solution of this material in water was clear and essentially fiber-free.

*Example III*

Shredded wood pulp containing approximately 7% moisture, 92.5% ethanol, and 56.4% aqueous sodium hydroxide were added continuously to a screw-type mixer at rates of 1.12, 1.33, and 1.20 pounds per minute, respectively. The mass was extruded from the end of the mixing apparatus through a die having a single central die opening. A pressure of 30 pounds per square inch die opening was exerted upon the mass leaving the extrusion die by a tapered cone 1⅞ inches in diameter centered in the die. The minimum inner diameter of the die was 3½ inches, and the diameter of the mixing screw was 4 inches. The screw was rotated at a speed of 87.5 r.p.m., and the teeth oscillated at 87.5 cycles per minute. The extruded reaction mass was given one pass through a comminuter and subsequently steeped for 25 minutes at 30–40° C. The soda cellulose was then fed continuously into a screw-type mixer of the aforementioned type and size at a rate of 4.16 pounds per minute and sprayed with 1.60 pounds per minute of an alcoholic monochloroacetic acid solution composed of one part of 92.5% ethanol and one part of monochloroacetic acid. A pressure of 35 pounds per square inch was exerted upon the extruded mass by the aforementioned cone and the mass was subjected to one pass through a comminuter.

The sodium CMC was returned to a rotating drum where it was aged for 2 hours at 60–65° C. The reaction efficiency of the run was 75.6% based on a theoretical degree of etherification of 1.15 and an actual degree of etherification of 0.87. A 2% solution of this material was clear and essentially fiber-free.

*Example IV*

The procedure described in Example III was repeated except that 1.18 pounds per minute of shredded wood pulp containing approximately 7% moisture was sprayed continuously with 1.44 pounds per minute of 92.5% ethanol and 1.00 pound per minute of a 55.5% sodium hydroxide solution. In the second stage, the soda cellulose from the first stage was fed continuously into the mixer at a rate of 2.90 pounds per minute with 1.00 pound per minute of an alcoholic monochloroacetic acid solution composed of one part of 92.5% ethanol and one part of monochloroacetic acid. The reaction efficiency of the run was 82.5% based on a theoretical degree of etherification of 0.90 and an actual degree of etherification of 0.74. A 2% solution of this material in water was clear and essentially fiber-free.

*Example V*

The procedure described in Example III was repeated except that 0.99 pound per minute of shredded wood pulp containing approximately 7% moisture was sprayed continuously with 1.04 pounds per minute of isopropanol and 1.20 pounds per minute of a 49.8% sodium hydroxide solution. In the second stage, the soda cellulose from the first stage was fed continuously into the mixer at a rate of 4.16 pounds per minute with 1.60 pounds per minute of an alcoholic monochloroacetic acid solution composed of half isopropanol and half monochloroacetic acid. The reaction efficiency of the run was 76.5% based on a theoretical degree of etherification of 0.88. A 2% solution of this material in water was clear and essentially fiber-free.

*Example VI*

The procedure described in Example V was repeated except that tert-butyl alcohol was substituted in all cases where isopropanol was used. The reaction efficiency of the run was 76.5% based on a theoretical degree of etherification of 1.15 and an actual degree of etherification of 0.88. A 2% solution of this material in water was clear and essentially fiber-free.

*Example VII*

One hundred parts of shredded wood pulp containing approximately 7% moisture was put into a sigma-blade type mixer. While the pulp was being agitated, it was sprayed with 102.9 parts of 61.0% sodium hydroxide solution followed by 73.8 parts of 86.0% ethanol. When all the sodium hydroxide and ethanol had been added, mixing of the mass was continued for 1 minute. The mass was then passed at a rate of 50 parts per minute through a screw-type mixer equipped with an extrusion die having a single central die opening. The minimum inner diameter of the die was 1⅜ inches, and the diameter of the mixing screw was 2 inches. The screw was rotated at a speed of 50 r.p.m., and the teeth oscillated at 50 cycles per minute. The extruded column of the reaction mass was steeped for 30 minutes at 30–40° C. The soda cellulose was then sprayed with an alcoholic solution of monochloroacetic acid composed of 120.9 parts of 86.0% ethanol and 65.1 parts of monochloroacetic acid. When all the ethanol and monochloroacetic acid had been added, mixing of the mass was continued for 1 minute. The reaction mass was then passed at a rate of 50 parts per minute through a screw mixer of the aforementioned size and type and then aged, without agitation, for 2 hours at 60–65° C. The reaction efficiency of the run was 69.2%, based on a theoretical degree of etherification of 1.2 and an actual degree of etherification of 0.83. A 2% solution of this material in water was clear and essentially fiber-free.

*Example VIII*

The procedure described in Example VII was repeated except that 100 parts of shredded wood pulp containing approximately 7% moisture was sprayed with 102.9 parts of 61.0% sodium hydroxide solution followed by 129.6 parts of 86.0% ethanol. In the second stage, the soda cellulose from the first stage was sprayed with an alcoholic solution of monochloroacetic acid consisting of 65.1 parts of 86.0% ethanol and 65.1 parts of monochloroacetic acid. The extruded mass was aged, without agitation, for 0.5 hour. The reaction efficiency of the run was 66.7% based on a theoretical degree of etherification of 1.2 and actual degree of etherification of 0.8. A 2% solution of this material in water was clear and essentially fiber-free.

*Example IX*

The procedure outlined in Example VII was followed except that 100 parts of cellulose containing approximately 7% moisture was sprayed with 106.2 parts of 59.1% sodium hydroxide and then with 172.8 parts of 86.0% ethanol. In the second stage, the first stage product was sprayed with a solution consisting of 65.1 parts of 86.0% ethanol and 65.1 parts of monochloroacetic acid. The reaction mass was then passed through a screw mixer, extruded, and aged without agitation for 2 hours. The reaction efficiency of the run was 69.2 based on a theoretical degree of etherification of 1.2 and an actual degree of etherification of 0.83. A 2% solution of this material in water was clear and essentially fiber-free.

Though the operating temperature of the reaction mass at various points in the process is of some significance, temperature cannot generally be considered a critical factor in the operability of the process. Excessively high temperatures should be avoided in order to forestall undue degradation of the cellulose and the cellulose ether product. Exceptionally low temperatures would not be used because of their retarding effect on the reaction. The first stage of the process, i.e., the preparation of alkali cellulose, is best conducted at temperatures no higher than about 60° C., and preferably within the range of about 35 to 50° C. In cases in which a low-viscosity product is desired and in which an off-color product can be tolerated, temperatures above 60° C. may be used. The second stage of the process, i.e., the etherification of the alkali cellulose, is generally conducted at somewhat higher temperatures than the first stage. The operating temperature for this stage is preferably in the range of about 50 to 70° C. with 60° C. being most preferred. The etherification reaction is a time-temperature function. It will proceed satisfactorily at room temperature, but requires in the neighborhood of 16 hours at this temperature to go to completion. The reaction will proceed much faster in the preferred 50–70° C. temperature range, but even here requires at least about a half-hour. At still higher temperatures, the reaction is even faster, but at such temperatures degradation of the product may become a problem.

The first stage of the process, i.e., the preparation of alkali cellulose, is a novel and convenient process technique in itself of rather wide applicability. With or without the alcohol wetting agent, this technique may be used for the preparation of alkali cellulose as the first step in the preparation of a variety of cellulose derivatives other than alkali metal salts of CMC, as for example cellulose esters and ethers, regenerated cellulose, and the like.

The etherifying agent employed in the present process is monochloroacetic acid, which is converted in the reaction mass to sodium monochloroacetate due to the presence of the caustic soda. The etherifying agent will usually be added as the free acid, but it may be added as a salt.

The etherifying agent will be added in an amount of less than 3 moles per anhydroglucose mole unit of cellulose. Theoretically, the maximum degree of substitution obtainable is 3.0 because there are 3 hydroxyl groups in each anhydroglucose unit of cellulose which are susceptible to etherification. This corresponds on a weight basis to 1.75 parts of the etherifying agent per part of cellulose. Larger amounts of etherifying agent are operable but serve no useful function. Since most commercial CMC products have an actual degree of etherification of less than 1.5, the actual amount of etherifying agent used will usually be less than about 1.75 parts per part of cellulose.

The novel process of the present invention has been described and illustrated in the foregoing specification. It will be readily apparent to those skilled in the art that many variations in procedures and compositions may be made without departing from the spirit and scope of the invention. It is intended therefore to be limited only by the following claims.

We claim:
1. A two-stage continuous process for the preparation of a water-soluble alkali metal salt of carboxymethylcellulose in which the first stage involves the preparation of alkali cellulose and the second stage involves the etherification of the alkali cellulose, said first stage comprising mixing intimately and thoroughly a comminuted cellulose with a lower alkanol having from 2 to 4 carbon atoms and aqueous alkali, extruding the resultant mass under pressure through a die, and thereafter steeping the extruded material for a period of at least about 10 minutes, said second stage comprising intimately and thoroughly mixing the product from the first stage with monochloroacetic acid, extruding the resultant mass under pressure through a die, and thereafter aging the extruded material for a period of at least about one-half hour, the amount of water present throughout said process being in the range of about 0.4 to 1.2 parts by weight per part of cellulose, at least about 75% of the water being present during the first stage, the amount of alkanol present throughout said process being in the range of about 1.0 to 2.5 parts by weight per part of cellulose, at least 35% of the alkanol being present during the first stage, the weight ratio of alkali added during the first stage to monochloroacetic acid added during the second stage being in the range of about 0.86 to 1.25 parts of alkali per part of monochloroacetic acid, and the mole ratio of monochloroacetic acid to anhydroglucose units of said cellulose being less than about 1.5:1.

2. A two-stage continuous process for the preparation of water-soluble sodium carboxymethylcellulose in which the first stage involves the preparation of soda cellulose and the second stage involves the etherification of the soda cellulose, said first stage comprising mixing intimately and thoroughly a comminuted cellulose having a maximum dimension of no larger than 1.5 millimeters with a lower alkanol having from 2 to 4 carbon atoms and aqueous sodium hydroxide, extruding the resultant mass under pressure through a die, and thereafter steeping the extruded material for a period of at least about 10 minutes, said second stage comprising intimately and thoroughly mixing the product from the first stage with a solution of monochloroacetic acid in said lower alkanol, extruding the resultant mass under pressure through a die, and thereafter aging the material for a period of at least about one-half hour, the amount of water present throughout said process being in the range of about 0.60 to 1.0 part by weight per part of cellulose, at least 75% of the water being present during the first stage, the amount of lower alkanol present throughout said process being in the range of about 1.6 to 2.0 parts by weight per part of cellulose, at least 35% of the lower alkanol being present during the first stage, the weight ratio of sodium hydroxide added during the first stage to monochloroacetic acid added during the second stage being in the range of about 0.90 to 1.0 part of sodium hydroxide per part of monochloroacetic acid, and the mole ratio of monochloroacetic acid to anhydroglucose units of said cellulose being less than about 1.5:1.

3. A process according to claim 2 in which said lower alkanol is ethanol.

References Cited in the file of this patent

UNITED STATES PATENTS

| | | |
|---|---|---|
| 1,884,629 | Dreyfuss | Oct. 25, 1932 |
| 2,278,612 | Collings et al. | Apr. 7, 1942 |
| 2,331,865 | Swinehart et al. | Oct. 12, 1943 |
| 2,636,879 | Branan et al. | Apr. 28, 1953 |